United States Patent [19]
Allonca

[11] 3,955,378
[45] May 11, 1976

[54] NON-FRICTION COUPLING SYSTEM
[76] Inventor: Manuel J. Allonca, P.O. Box 4676, Panama 5, Panama
[22] Filed: July 16, 1974
[21] Appl. No.: 489,042

[52] U.S. Cl. .................................. 64/30 R; 64/7; 192/105 BA; 192/105 CD
[51] Int. Cl.² .......................................... F16D 7/02
[58] Field of Search .............. 192/105 BA, 105 CD, 192/103 B, 30; 64/8, 7, 30 R

[56] References Cited
UNITED STATES PATENTS

| | | | |
|---|---|---|---|
| 289,427 | 12/1883 | Malcolmson ................. | 192/105 CD |
| 1,874,658 | 8/1932 | Tschudi ....................... | 192/105 BA |
| 2,074,510 | 3/1937 | Junkers ....................... | 192/105 BA |
| 3,656,599 | 4/1972 | Diggs ........................... | 192/105 BA |

Primary Examiner—Samuel Scott
Assistant Examiner—Randall Heald
Attorney, Agent, or Firm—Clarence A. O'Brien; Harvey B. Jacobson

[57] ABSTRACT

A non-friction coupling system having angularly adjusted first and second members pivotally connected to respective coaxial drive and driven shafts. The members engage one another as by a ball and socket joint for permitting rotation of each member with respect to the other member. An operator assembly is associated with one of the members for displacement thereof along the common rotational axis to vary an angle included between the shafts. The coupling system will be disengaged when the angularly adjusted members are coaxial, then having an included angle at 180°.

9 Claims, 4 Drawing Figures 3,955,378

NON-FRICTION COUPLING SYSTEM

BACKGROUND OF THE INVENTION

1. Field of the Invention

The present invention relates generally to a torque transmitting system, and particularly to a clutch system that permits coupling and uncoupling of two shafts, one of which is collared, with a minimum of friction.

2. Description of the Prior Art

Torque transmitting devices presently employed on motor vehicles, and the like, are based on the friction engagement of clutch pressure plates which are selectively engageable with one another. These known devices necessarily suffer from great wear to their components, thus requiring frequent adjustments to the system.

It is well known to provide universal joints based on the Hooke's joint. See U.S. Pat. No. 3,792,597, issued Feb. 19, 1974 to M. Orain.

SUMMARY OF THE INVENTION

It is an object of the present invention to provide an improved torque transmitting system that is simple, yet rugged and reliable.

It is another object of the present invention to provide a torque transmitting system having a minimum of frictional contact between the engaging elements.

These and other objects are achieved according to the present invention by providing a non-friction torque transmitting system having: a first coupling member pivotally connected to a drive shaft for rotation therewith; a second coupling member pivotally connected to a driven shaft coaxially with the drive shaft, the second member being connected to the driven shaft for rotating same and arranged engaging the first by means of a universal joint member for rotation with respect thereto; and an operator assembly associated with one of the first and second members for mounting same for movement along the shaft associated with the selected member and varying an included angle between the members. When the angle between the members is less than 180°, a Hooke's joint is formed causing torque to be transmitted from the drive shaft to the driven shaft at a one-to-one ratio for each revolution as will be appreciated by those skilled in the art.

According to a preferred embodiment of the present invention, one of the first and second members terminates in a ball and the other in a socket to form the universal joint. The ball is advantageously arranged in the socket for engaging the first member with the second member. A weight may be provided on the socket for causing the members to move to their torque transmitting position under the influence of a predetermined centrifugal force exerted on the weight.

The operator assembly advantageously includes a keyed joint mounting the second member on the driven shaft, and a pivotally mounted clutch pedal arm engaging the second member for moving same axially toward the drive shaft for causing the members to assume their torque transmitting position.

These together with other objects and advantages which will become subsequently apparent reside in the details of construction and operation as more fully hereinafter described and claimed, reference being had to the accompanying drawings forming a part hereof, wherein like numerals refer to like parts throughout.

DESCRIPTION OF THE PREFERRED EMBODIMENT

Figure 1:
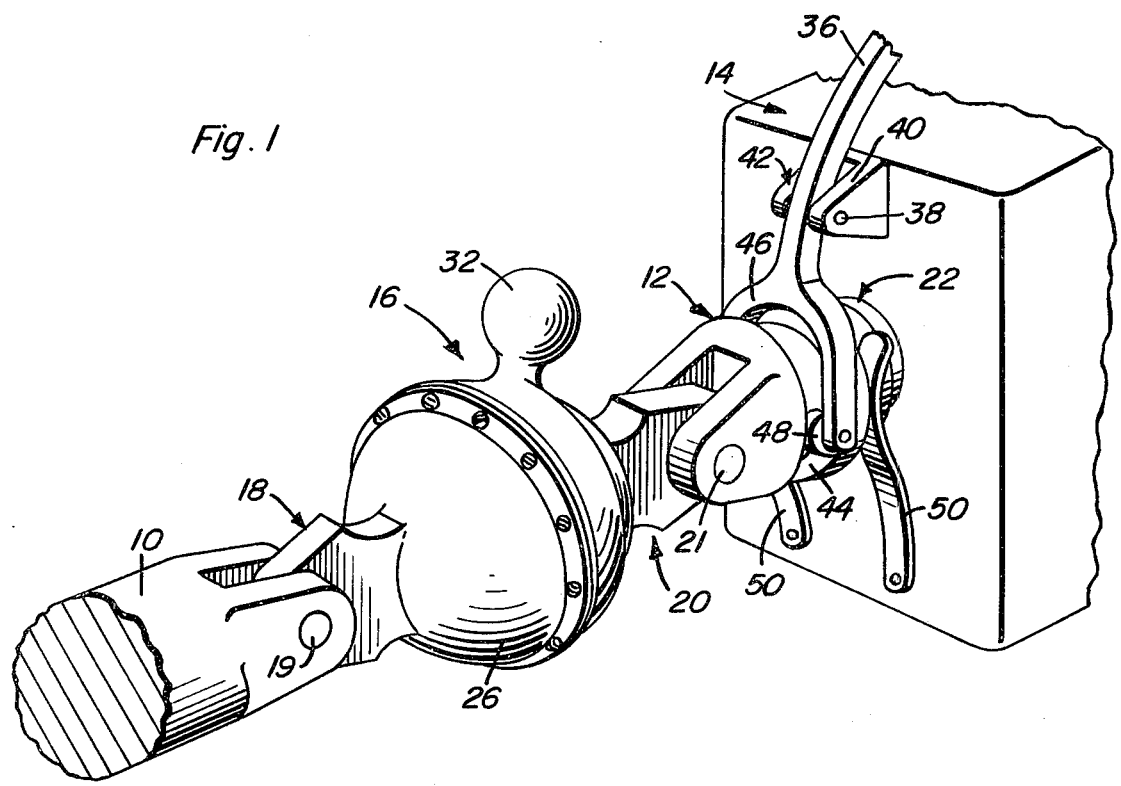
FIG. 1 is a fragmentary, perspective view showing a clutch system according to the present invention.
Figure 2:
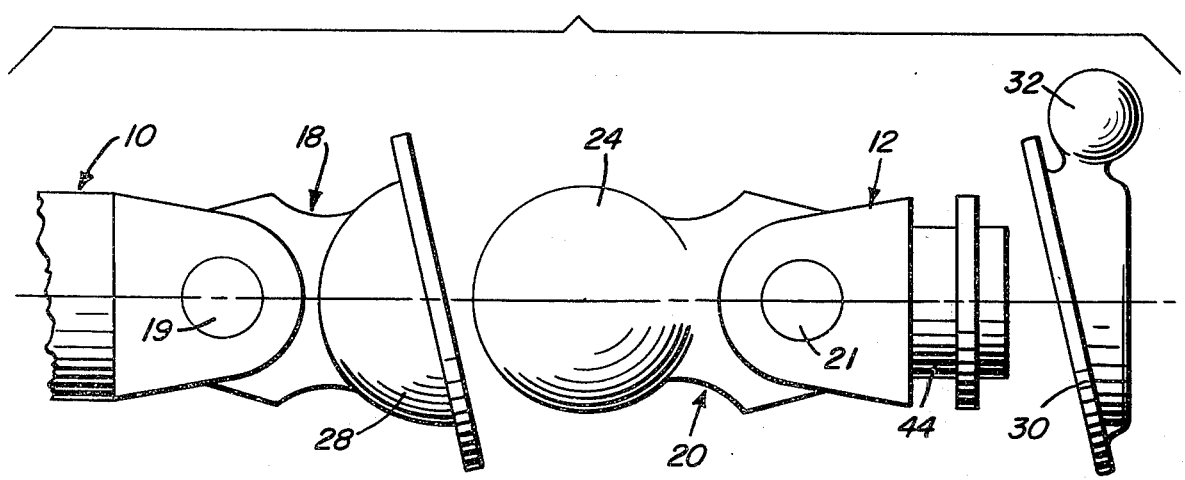
FIG. 2 is a fragmentary, exploded, side elevational view showing the clutch system of FIG. 1.

Referring now more particularly to FIGS. 1 and 2 of the drawings, a coaxially aligned rotating drive shaft 10, such as the output shaft of an engine, and an axially adjustable driven shaft 12 splined to the input to a conventional transmission 14, are selectively connected together by a non-friction torque transmitting coupling system 16 according to the present invention.

Coupling system 16 includes a first coupling member 18 pivotally connected as by a pin 19 arranged in suitable bores to drive shaft 10 for rotation therewith and thereby. A second coupling member 20 is pivotally connected to driven shaft 12 as by a pin 21 in a manner similar to the connection of member 18 to shaft 10. As can be readily appreciated from the drawings, the free ends of members 18 and 20 are arranged engaging one another for rotation with respect to each other in a preferred manner to be described below.

An operator assembly 22 is associated with one of members 18 and 20 for mounting same for movement along the common rotational axis of shafts 10 and 12 associated with the selected member and varying an angle A (FIGS. 3 and 4) included between members 18 and 20.

One of the members 18 and 20, member 20 in the illustrated embodiment, terminates in a ball 24, and the other of the members terminates in a socket 26 to form a universal joint. Ball 24 is arranged in socket 26 for causing member 18 to engage with member 20. As perhaps can best be seen from FIG. 2 of the drawings, socket 26 is formed by a flanged base 28 and a flanged cover 30 connected together in a suitable manner such as by the illustrated bolts spaced about the flanges of the base and cover. A weight 32 is advantageously provided on socket 26 for causing member 18 to transmit motion to member 20 by the influence of a predetermined amount of centrifugal force being exerted on weight 32 when member 18 is rotated by drive shaft 10 tending to displace the weight radially outwardly.

Operator assembly 22 may be formed by a keyed joint such as splines 34 (FIGS. 3 and 4) mounting, for example, member 20 on shaft 12. A clutch pedal arm 36 pivotally mounted on, for example, transmission 14 as by a pin 34 arranged in ears 40 of bracket 42, engages a groove 44 provided in driven shaft 12 as by a yoke 46 terminating in rollers 48. Only one of rollers 48 is shown in the drawings. A pair of leaf springs 50 may engage the end of shaft 12 opposing transmission 14 for biasing member 20 toward member 18 and assisting weight 32 in causing system 16 to transmit torque. It will be appreciated that this centrifugal force displacing feature of the present invention is only desirable in certain applications of system 16.

Figure 3:
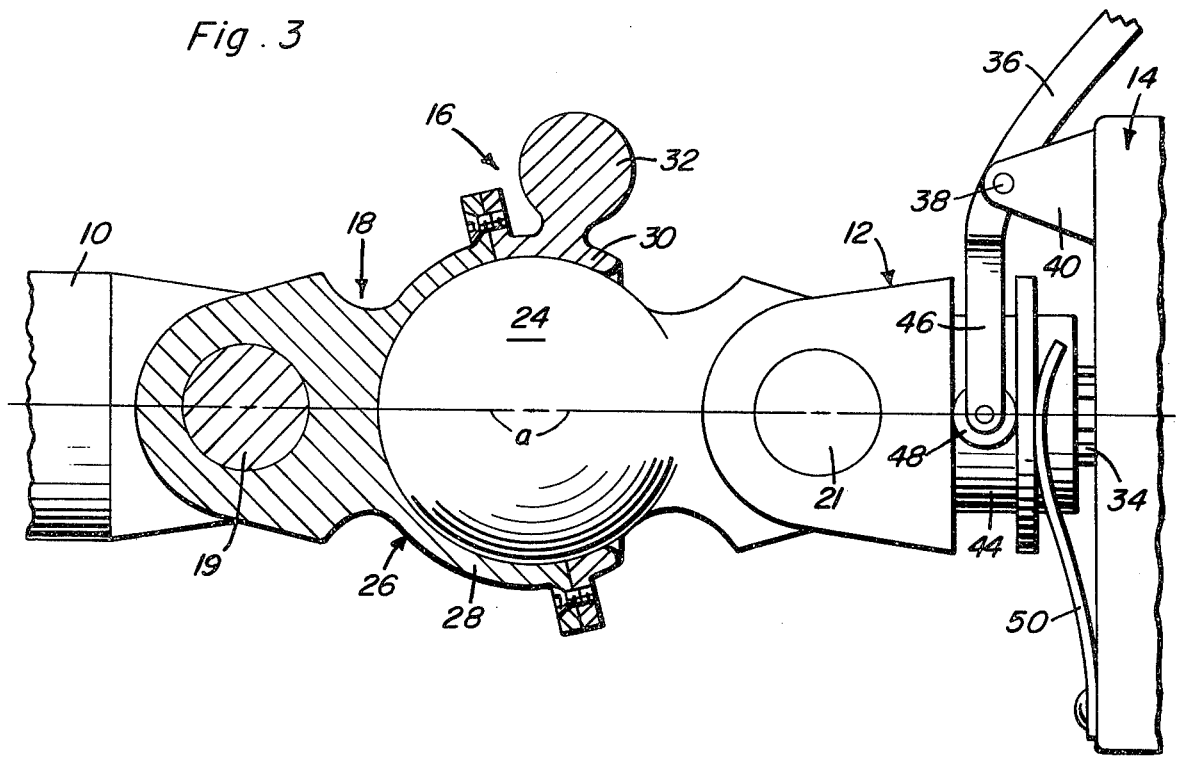
FIG. 3 is a fragmentary, side elevational view, partly cut away and in section, showing the clutch system of FIGS. 1 and 2 in the disengaged mode thereof.
Figure 4:
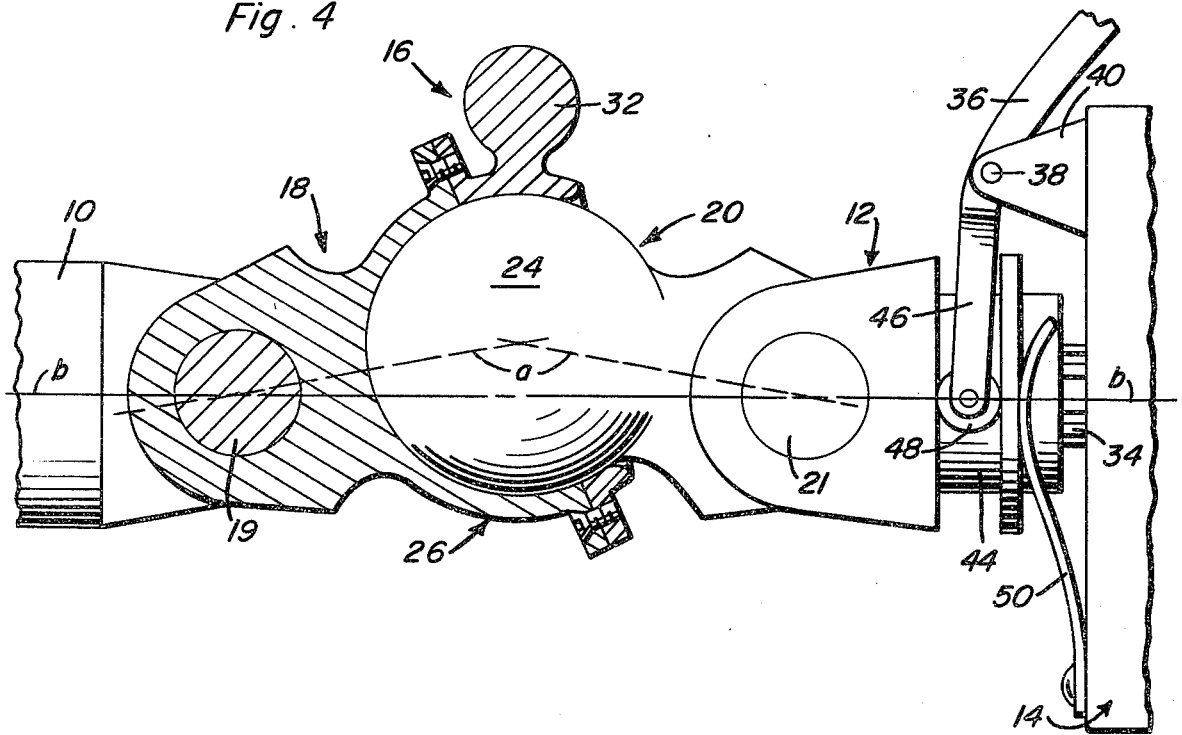
FIG. 4 is a fragmentary, side elevational view, partly cut away and in section, similar to FIG. 3, but showing the clutch system in its engaged mode.

Referring now more particularly to FIGS. 3 and 4 of the drawings, FIG. 3 shows system 16 in its non-transmitting mode wherein elements 18 and 20 are coaxial with one another and shafts 10, 12. More specifically, the included angle A between elements 18, 20 is substantially 180 degrees. FIG. 4 of the drawings shows system 16 in its actuated mode wherein elements 18, 20 are at an angle to the common rotational axis b-b of the coaxial shafts 10, 12. That is, angle a is less than 180 degrees. It will be appreciated that in the mode shown in FIG. 4, a Hooke's joint is formed whereby the rotation of element 18 will necessarily cause element 20 to rotate and element 18 which the corresponding end of element 20. As a Hooke's joint the coupling system 16 operates in a manner well known to transmit torque at a one-to-one coupling ratio between the drive and driven shafts for each revolution. The relative rotational ratio between the coupling members 18 and 20 will, however, vary instantaneously during each revolution as a trigometric function of the angle a. Therefore, in the non-transmitting mode shown in FIG. 3, coupling member 18 will merely rotate relative to stationary coupling member 20 since angle a is 180 degrees.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. In combination with drive and driven members rotatable about a common rotational axis, a torque transmitting system, comprising a pair of coupling members, a pair of pivot joints connecting said coupling members respectively to the drive and driven members for rotation therewith, universal joint means interconnecting said coupling members in angular relationship to each other for transmitting torque between said drive and driven members, means for axially displacing said pivot joints relative to each other along said common rotational axis to vary the angular relationship between the coupling members, and operating means connected to said axial displacing means for positioning the coupling members in coaxial relationship to the drive and driven members to interrupt transmission of torque therebetween.

2. The combination of claim 1 wherein said universal joint means comprises a ball and socket connection.

3. The combination of claim 2 including centrifugal means connected to the universal joint means for centrifugally biasing the coupling members away from said coaxial relationship in response to rotation of the drive member.

4. The combination of claim 3 wherein said operating means includes an actuator device engageable with the axial displacing means for relative displacement of the pivot joints in one direction tending to position the coupling members in said coaxial relationship and spring means engageable with the axial displacing means for opposing said displacement by the actuator device and thereby augment the bias of the centrifugal means.

5. The combination of claim 1 including centrifugal means connected to the universal joint means for centrifugally biasing the coupling members away from said coaxial relationship in response to rotation of the drive member.

6. The combination of claim 5 wherein said operating means includes an actuator device engageable with the axial displacing means for relative displacement of the pivot joints in one direction tending to position the coupling members in said coaxial relationship and spring means engageable with the axial displacing means for opposing said displacement by the actuator device and thereby augment the bias of the centrifugal means.

7. The combination of claim 1 wherein said operating means includes an actuator device engageable with the axial displacing means for relative displacement of the pivot joints in one direction tending to position the coupling members in said coaxial relationship and spring means engageable with the axial displacing means for opposing said displacement by the actuator device.

8. The combination of claim 1 wherein the universal joint means includes a socket element connected to one of the coupling members, a ball element connected to the other of the coupling members and received in the socket element to establish a movable pivot axis that intersects the common rotational axis when the coupling members are positioned in said coaxial relationship.

9. The combination of claim 8 including a centrifugal weight connected to the socket element in eccentric relation to the common rotational axis.

* * * * *